United States Patent Office 2,981,694
Patented Apr. 25, 1961

2,981,694

REGENERATION OF SUPPORTED PLATINUM CATALYSTS

Willem Frederik Engel, Amsterdam, Netherlands, assignor to Shell Oil Company, a corporation of Delaware No Drawing. Filed Sept. 19, 1955, Ser. No. 535,303

Claims priority, application Netherlands Sept. 23, 1954

5 Claims. (Cl. 252—415)

This invention relates to the regeneration of supported platinum catalysts, especially platinum supported on alumina or a carrier consisting mainly of alumina.

Supported platinum catalysts, and especially platinum on alumina or on a carrier consisting mainly of alumina, are used in various hydrocarbon conversions such as hydrogenation, dehydrogenation, isomerization, dehydrocyclization, hydrocracking, and certain oxidations. More particularly these catalysts are especially suitable and are widely used for the reforming of gasolines and fractions thereof. In this process the hydrocarbon fraction is passed in vapor form over the catalyst in the presence of hydrogen at temperatures of the order of 850 to 1000° F. and elevated pressures of the order of 100–700 p.s.i. The catalysts are also used under approximately these conditions for the production of aromatic hydrocarbons from naphthenes or hydrocarbon mixtures containing naphthenes such, for example, as the conversion of cyclohexane, and/or methylcyclopentane to benzene.

For most of the mentioned purposes, the catalyst is promoted for the desired reaction or reactions by the presence of one or more promoters which may be, for example, boric oxide, silica, phosphate, or combined halogen, e.g. fluorine and chlorine.

When used under mild conditions, these catalysts usually maintain their activity quite well and allow continuous operation, i.e. the catalyst is used continuously without intermittent regeneration treatment until it is spent at which time it is then discarded or reconstituted. The catalyst does, however, decline in activity with use, particularly when operating under the more severe conditions desired for high conversions, and in view of the high cost of reconstituting it (about $5.00 per lb.) an efficient means for regenerating the catalyst is highly desirable.

The decline of the activity of the catalyst in use is due to a combination of several factors, the most important of which are blacking by carbonaceous deposits, poisoning by traces of poisons such as arsenic, lead, antimony, etc., and subtle alterations of the surface structure. Also in those cases where the catalyst is originally promoted with combined halogen, part of the deactivation may be due to some loss of halogen, particularly chlorine (see U.S. Patent No. 2,642,384).

It has frequently been stated in the patent literature relating to such catalysts and their use that the catalysts may be regenerated to substantially their initial activity and the methods described are essentially the conventional regeneration method which comprises burning off the carbonaceous deposits under conditions controlled to prevent excessive temperatures, followed by the usual reduction treatment and final adjustment of the halogen concentration in such cases where it is necessary. It has been found that such treatments, when carefully carried out do in fact restore the catalyst to essentially its initial activity. And in some cases the first such regeneration may even give an enhanced activity. Note for example U.S. Patent No. 2,664,404. The catalysts so regenerated are, however, not the equivalent of fresh catalyst, inasmuch, as their decline rates are much faster and increase after each such regeneration. Only a few such regenerations can therefore be applied before the life between regenerations becomes too short to be practical. Note, for example, U.S. Patent No. 2,635,080.

The object of the present invention is to provide an improved method for the regeneration of such catalyst without removing the platinum which method not only restores the catalyst to essentially its original activity but also to essentially its activity-stability, i.e. low decline rate.

This object is accomplished according to the following method which broadly described consists of removing at least a portion of the carbonaceous deposits, e.g. by burning and/or steaming, and then treating the catalysts with a gaseous mixture of an oxygen-containing gas, steam, and hydrogen chloride, the mole ratio of steam to hydrogen chloride being at least 100, and the partial pressure of oxygen being at least substantially equal to the partial pressure of hydrogen chloride. The treatment is carried out at a temperature between about 250 and 550° C. preferably between 400 and 500° C. for a time of at least about one hour.

In one embodiment of the invention the carbonaceous deposits are first partly or completely removed by burning them with air or oxygen under conditions carefully controlled so that the temperature does not exceed about 550° C. and preferably does not exceed 500° C. Any of the known methods for effecting this conventional method of removing carbonaceous deposits from catalysts may be used. The catalyst is then treated with the mixture of air, steam and hydrogen chloride as described.

In another embodiment of the invention the carbonaceous deposits are first partly removed from the catalyst by steaming the catalyst for a time at a temperature approaching 500° C., after which the catalyst is treated with the mixture of air, steam and hydrogen chloride as described.

The presence of steam in the large excess indicated above has been found to be of essential importance in the process. While the mole ratio of steam to hydrogen chloride may be as low as about 100 as indicated above, it is preferably considerably in excess of this and may be as high as 2000 or higher. It has been found that for best results, the ratio of steam to hydrogen chloride in the mixture varies to a certain extent according to the temperature at which the treatment is carried out and that when operating in the preferred temperature range of 400° C. to 500° C. this molar ratio is preferably between about 250 and about 1250. It will be noticed that the temperature here is below that required for any appreciable steam-carbon reaction.

The presence of the oxygen in the gas mixture is essential. However, the results are normally only slightly affected by differences in the oxygen content. Thus, when the carbonaceous deposits are substantially completely removed by burning in the first stage of the process, the oxygen content in the gas mixture used in the second stage of the process may be the same or slightly lower than the concentration of the hydrogen chloride. It is normally, however, considerably higher, e.g. 100 times that of hydrogen chloride. It is preferred to use a molar excess of oxygen with respect to the hydrogen chloride since this gives the best results.

Temperatures in excess of 550° C. are not suitable in the treatment of the catalyst with the gas mixture as described, since such temperatures generally result in permanent damage to the catalyst. On the other hand, temperatures of less than 250° C. are also unsuitable since with reasonable treating times the desired effect is not obtained. The most suitable temperatures for the gas treatment are found to lie between about approximately 400° C. and 500° C.

The treatment of the catalyst with the gas mixture is normally carried out at a substantially atmospheric pressure, i.e. the small pressure required to pass the gas through a mass of the catalyst; however, higher or lower pressures can be used.

In most cases, a relatively short treatment, e.g. 1–5 hours, is sufficient to effect the desired improvement in the catalyst. There is no harm however, in treating the catalyst for a longer time and longer treatments may be desirable when operating at or near the lower end of the temperature range.

While the process is described in terms of hydrogen chloride in the gas mixture, it will be understood that the hydrogen chloride may in fact be formed in situ from other chlorine-containing compounds under the treating conditions. Also if desired, part of the hydrogen chloride may be substituted by hydrogen fluoride. The invention is not only applicable to catalysts consisting of platinum supported upon an alumina carrier, but also catalysts in which plantinum is supported on other microporous carriers, especially carriers which contain alumina as the main component along with minor quantities of one or more other components such as silica, magnesia, zirconium oxide, titanium oxide, beryllium oxide, etc. Also, the platinum may be substituted in whole or in part by other metals of the platinum group such as rhodium, ruthenium, palladium, osmium, and iridium.

As pointed out, in one embodiment of the invention the spent catalyst from treating a hydrocarbon or carbonaceous material and containing carbonaceous deposits is first treated to burn off at least a part of the carbonaceous deposits prior to treating the catalyst with the mentioned gas mixture. As pointed out, the removal of the carbonaceous deposits by controlled burning is well known and may be effected in the conventional way; merely by way of example, oxygen diluted with nitrogen may be passed through a bed of the catalyst, the oxygen concentration of the mixture being controlled so that the temperature of the catalyst does not exceed about 500° C. while the carbonaceous deposits are being burned off. This removal of the carbonaceous deposits and the treatment with the gas mixture may, however, also be made to coincide wholly or in part, and this results in a considerable reduction in the total time required for effecting the regeneration. In this case, the treatment may be advantageously carried out by first passing steam through the catalyst at a high temperature, e.g. 400° C.–500° C. whereby considerable amounts of the carbonaceous components are removed from the catalyst; air and hydrogen chloride are then added to the steam to form the mixture whereby the remaining part of the carbonaceous deposits is removed by oxidation by the air while the catalyst is simultaneously treated with the mentioned gas mixture.

After the catalyst has been regenerated as described, it may be subjected to a reducing treatment, e.g. by passing hydrogen over it at a temperature between 150–500° C. This reduction of the oxidized platinum is, however, extremely easily effected and normally takes place while bringing the catalyst to the conditions of temperature and pressure for a subsequent period of operation. This is done in a hydrogen atmosphere and as soon as the desired conditions of temperature and pressure are reached the carbonaceous reactant is introduced thereby initiating a new process period.

It has been found that the catalyst regenerated as described are much superior to those renegerated in the conventional manner without the treatment with the specified gas mixture in that they exhibit a much lower activity decline rate. It has also been found that the catalysts treated as described have greater selectivity when used for reforming gasolines in the sense that the yield of liquid product of a given octane number is higher and the production of the gaseous products is lower.

The mentioned results are not obtained by passing halogen or halogen compounds as such, or the same diluted with other materials, over the carbon free catalyst at elevated temperatures. Thus, for example, when the gas mixture was substituted by a mixture of chlorine diluted with nitrogen and the treatment was effected at 465° C., the yield of liquid product was inferior and the activity, although initially high, decreased rapidly during subsequent use.

It has also been determined that the equivalent result is not obtained by conventional regeneration followed by incorporating halogen into the catalysts by such means as for instance, impregnating the catalyst with hydrochloric acid (0.05 normal) followed by drying at 125° C. and calcination at 500° C.; impregnation with organic chlorine compounds, such as hexachloroethane, tetrachloroethane, hexachlorocyclohexane dissolved in pentane, followed by evaporation of the pentane and slowly heating to 500° C. in a hydrogen stream beginning at 10 atmosphere and increasing to 40 atmosphere. Catalysts deactivated through use have been regenerated by carefully burning off the carbonaceous deposits and then treating them in various other ways. Although the catalysts so treated could not be distinguished from each other by their chemical analyses and many of them were restored to essentially their initial activities, they were found to decline in activity at a more rapid rate upon subsequent use.

*Example*

In the catalytic reforming of naphtha, a platinum-alumina catalyst was used which contained 0.37% by weight of platinum, 0.2% by weight of chlorine and 0.5% by weight of fluorine. The fresh catalyst had a surface area of approximately 165 square meters per gram.

The naphtha being reformed was a straight run material boiling between about 93° C. and 214° C., having a F–2 octane number of 30, and consisting approximately of 17% by weight aromatics, 25% by weight of naphthenes and 58% by weight of paraffins.

The reforming was carried out by passing the naphtha vapors through a bed of the catalyst at 480° C. and 15 atmosphere pressure at a rate of 1.2 kilograms per liter of catalyst per hour together with hydrogen in amounts between about 800 and 1200 liters per kilogram of naphtha.

The catalytic reforming was carried out in five periods of approximately 200 hours each with intermediate regenerations. The regeneration was carried out in this case in the conventional manner which is to say, by passing through the catalyst a mixture of oxygen and nitrogen while taking care to ensure that the temperature of the catalyst was not able to raise above 500° C. while the carbon deposits were being burned off. To this end, after each reforming period, the catalyst was cooled in a nitrogen stream to 350° C. and then treated with a mixture of nitrogen containing 1% oxygen after which the temperatures and the oxygen concentration in the gas were gradually increased. Finally, the catalyst was heated for two hours at 500° C. while passing undiluted air. After purging with nitrogen and a subsequent reduction by means of hydrogen, the next reforming period was begun.

After each reforming period the activity of the catalyst was found to have decreased slightly while the decrease in activity during each reforming period proceeded at a progressively more rapid rate. Thus, the F–2 octane number of the liquid product obtained in the first reforming period was 85 at the end of 20 hours and 79 after 200 hours, in the fifth reforming period the octane number was 83 after 20 hours and already decreased to below 70 after only 100 hours.

The catalyst after use in the fifth reforming period was stripped of part of its carbonaceous deposits and then treated at 475° C. for four hours with a gas mixture consisting of one mole part of hydrogen chloride, 554 mole parts of steam and 223 mole parts of air. The catalyst was then reduced by hydrogen in the same manner as before and used in a subsequent reforming period under the same conditions as above. The F-2 octane number of the liquid product after twenty hours was 84 and after two hundred hours 79.5. Thus, the catalyst was restored to essentially its original activity and activity-stability whereas the same catalyst after the previous regeneration (fourth regeneration) lost its activity in less than 100 hours of use.

For clearness, the data are shown in the following table:

| Condition of catalyst | Fresh | | During fifth process period (i.e. after four conventional regenerations) | | Sixth process period (after regeneration according to the invention) | | |
|---|---|---|---|---|---|---|---|
| Process period hours | 20 | 200 | 20 | 100 | 20 | 100 | 200 |
| F-2 octane number of liquid product | 85 | 79 | 83 | <70 | 84 | 81 | 79.5 |

I claim as my invention:

1. The method for the regeneration of a catalyst comprising platinum on a support containing at least a major amount of alumina deactivated through use in the conversion of a carbonaceous reactant and containing carbonaceous deposits which comprises, removing at least a portion of the carbonaceous deposits at a temperature below 550° C., then treating the catalyst with a gaseous mixture of an oxygen-containing gas, steam, and hydrogen chloride, the molar ratio of steam to hydrogen chloride in said gas mixture being from 100 to 2000 and the molar ratio of oxygen to hydrogen chloride being from about 1 to 100, said treatment being carried out at a temperature between about 250 and 550° C. for a time of at least one hour.

2. The method for the regeneration of a catalyst comprising platinum on a support containing at least a major amount of alumina deactivated through use in the conversion of a carbonaceous reactant and containing carbonaceous deposits which comprises removing at least a portion of the carbonaceous deposits by controlled burning at a temperature below 550° C., then treating the catalyst with a gaseous mixture of an oxygen-containing gas, steam, and hydrogen chloride; the molar ratio of steam to hydrogen chloride in said gas mixture being from 100 to 2000 and the molar ratio of oxygen to hydrogen chloride being from about 1 to 100, said treatment being carried out at a temperature between about 250 and 550° C. for a time of at least one hour.

3. The method for the regeneration of a catalyst comprising platinum on a support containing at least a major amount of alumina deactivated through use in the conversion of a carbonaceous reactant and containing carbonaceous deposits which comprises removing at least a portion of the carbonaceous deposits by steaming at a temperature about 500° C., then treating the catalyst with a gaseous mixture of an oxygen-containing gas, steam, and hydrogen chloride, the molar ratio of steam to hydrogen chloride in said gas mixture being from 100 to 2000 and the molar ratio of oxygen to hydrogen chloride being from about 1 to 100, said treatment being carried out at a temperature between about 250 and 550° C. for a time of at least one hour.

4. The method for the regeneration of a catalyst comprising platinum on a support containing at least a major amount of alumina deactivated through use in the conversion of a carbonaceous reactant and containing carbonaceous deposits which comprises removing at least a portion of the carbonaceous deposits at a temperature below 550° C., then treating the catalyst with a gaseous mixture of an oxygen-containing gas, steam, and hydrogen chloride, the molar ratio of steam to hydrogen chloride in said gas mixture being from 100 to 2000 and the molar ratio of oxygen to hydrogen chloride being from about 1 to 100, said treatment being carried out at a temperature between about 400 and 500° C. for a time of at least one hour.

5. The method for the regeneration of a catalyst comprising platinum on a support containing at least a major amount of alumina deactivated through use in the conversion of a carbonaceous reactant and containing carbonaceous deposits which comprises removing at least a portion of the carbonaceous deposits, then treating the catalyst with a gaseous mixture of an oxygen-containing gas, steam, and hydrogen chloride, the molar ratio of steam to hydrogen chloride in said gas mixture being between 250 and 1250 and the molar ratio of oxygen to hydrogen chloride being from about 1 to 100, said treatment being carried out at a temperature between about 250 and 550° C. for a time of at least one hour.

References Cited in the file of this patent

UNITED STATES PATENTS

| | | |
|---|---|---|
| 1,678,627 | Jaeger | July 24, 1928 |
| 2,246,900 | Schulze et al. | June 24, 1941 |
| 2,546,031 | Hanson | Mar. 20, 1951 |
| 2,642,384 | Cox | June 16, 1953 |
| 2,752,289 | Haensel | June 26, 1956 |
| 2,785,138 | Milliken | Mar. 12, 1957 |
| 2,785,139 | Heinemann | Mar. 12, 1957 |
| 2,916,440 | Hogin | Dec. 8, 1959 |